(12) United States Patent
Robinson et al.

(10) Patent No.: US 8,854,802 B2
(45) Date of Patent: Oct. 7, 2014

(54) DISPLAY WITH ROTATABLE DISPLAY SCREEN

(75) Inventors: Ian N Robinson, Pebble Beach, CA (US); April Slayden Mitchell, San Jose, CA (US); Mark C Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 13/018,171

(22) Filed: Jan. 31, 2011

(65) Prior Publication Data

US 2012/0099250 A1   Apr. 26, 2012

Related U.S. Application Data

(63) Continuation-in-part of application No. PCT/US2010/053860, filed on Oct. 22, 2010.

(51) Int. Cl.
*G06F 1/16*  (2006.01)
*H05K 5/00*  (2006.01)
*H05K 7/00*  (2006.01)
*G02F 1/1347*  (2006.01)

(52) U.S. Cl.
CPC ............ *G06F 1/1615* (2013.01); *G06F 1/1637* (2013.01)
USPC ........................................ 361/679.21; 349/74

(58) Field of Classification Search
USPC ............ 361/679.01, 679.02, 679.07, 679.08, 361/679.21–679.3
See application file for complete search history.

(56) References Cited

U.S. PATENT DOCUMENTS

| | | | |
|---|---|---|---|
| 4,997,263 A | | 3/1991 | Cohen et al. |
| 5,252,950 A | | 10/1993 | Saunders et al. |
| 5,266,930 A | | 11/1993 | Ichikawa et al. |
| 5,808,711 A | * | 9/1998 | Suppelsa et al. ................. 349/74 |
| 6,040,945 A | * | 3/2000 | Karasawa ..................... 359/630 |
| 6,481,851 B1 | | 11/2002 | McNelley et al. |
| 6,542,146 B1 | * | 4/2003 | Toffolo et al. ................. 345/156 |
| 6,710,797 B1 | | 3/2004 | McNelley et al. |
| 6,710,831 B1 | * | 3/2004 | Winker et al. ................. 349/115 |
| 6,767,099 B2 | | 7/2004 | Perkins et al. |
| 6,771,294 B1 | | 8/2004 | Pulli et al. |
| 6,927,747 B2 | * | 8/2005 | Amirzadeh et al. ............... 345/4 |
| 7,016,183 B2 | * | 3/2006 | Takemoto et al. ........ 361/679.07 |
| 7,177,144 B2 | | 2/2007 | Ha et al. |

(Continued)

FOREIGN PATENT DOCUMENTS

| | | |
|---|---|---|
| CN | 2602454 Y | 2/2004 |
| JP | 7234743 A | 9/1995 |
| KR | 20030058204 A | 7/2003 |
| WO | 2010007426 A2 | 1/2010 |

OTHER PUBLICATIONS

Billinghurst et al ~ "Towards Ambient Augmented Reality With Tangible Interfaces" ~ Human Computer Interaction ~ Part III HCII 2009 ~ pp. 387396.

(Continued)

*Primary Examiner* — Adrian S Wilson

(57) ABSTRACT

A display that includes a rotatable display screen is described. The rotatable display screen for operating in at least a transparent background screen mode and an opaque background screen mode. The rotatable display screen has a first and second surface. The display further includes a support structure for supporting the rotatable display screen in at least a first and a second position.

14 Claims, 11 Drawing Sheets

(56) References Cited

U.S. PATENT DOCUMENTS

| | | | |
|---|---|---|---|
| 7,385,600 | B2 | 6/2008 | Marion |
| 7,502,221 | B2* | 3/2009 | Fuller et al. ............. 361/679.55 |
| 7,567,436 | B2 | 7/2009 | Jeong |
| 7,685,524 | B2 | 3/2010 | Rekimoto |
| 7,724,511 | B2 | 5/2010 | Jacobs |
| 7,951,001 | B2* | 5/2011 | Wells ............................ 463/33 |
| 7,983,920 | B2 | 7/2011 | Sinclair, II |
| 8,046,719 | B2 | 10/2011 | Skourup et al. |
| 2002/0044152 | A1 | 4/2002 | Abbott et al. |
| 2003/0107643 | A1 | 6/2003 | Yoon |
| 2003/0142068 | A1 | 7/2003 | DeLuca et al. |
| 2003/0151726 | A1 | 8/2003 | Perkins et al. |
| 2003/0169213 | A1* | 9/2003 | Spero ............................... 345/7 |
| 2003/0221876 | A1* | 12/2003 | Doczy et al. ............... 178/18.01 |
| 2004/0029636 | A1* | 2/2004 | Wells ............................ 463/32 |
| 2005/0041009 | A1 | 2/2005 | Kuroda |
| 2005/0046953 | A1 | 3/2005 | Repetto et al. |
| 2005/0083713 | A1 | 4/2005 | Boks |
| 2005/0156946 | A1* | 7/2005 | Nakano ........................ 345/619 |
| 2005/0166163 | A1 | 7/2005 | Chang et al. |
| 2005/0253775 | A1* | 11/2005 | Stewart ......................... 345/1.1 |
| 2006/0017654 | A1 | 1/2006 | Romo |
| 2006/0092355 | A1* | 5/2006 | Yang et al. .................... 349/114 |
| 2006/0100014 | A1* | 5/2006 | Griswold et al. ............... 463/31 |
| 2006/0108483 | A1 | 5/2006 | Wolff et al. |
| 2006/0250320 | A1* | 11/2006 | Fuller et al. .................... 345/1.1 |
| 2006/0268500 | A1* | 11/2006 | Kuhn ............................. 361/683 |
| 2007/0066247 | A1* | 3/2007 | Mooney ....................... 455/90.3 |
| 2007/0086155 | A1* | 4/2007 | Chen et al. ................... 361/683 |
| 2007/0103454 | A1* | 5/2007 | Elias ............................ 345/173 |
| 2007/0164988 | A1 | 7/2007 | Ryu et al. |
| 2007/0200547 | A1 | 8/2007 | Chen |
| 2007/0236485 | A1 | 10/2007 | Trepte |
| 2007/0291008 | A1 | 12/2007 | Wigdor et al. |
| 2008/0018555 | A1 | 1/2008 | Kuo et al. |
| 2008/0024523 | A1 | 1/2008 | Tomite et al. |
| 2008/0084395 | A1 | 4/2008 | Dawson et al. |
| 2008/0088602 | A1 | 4/2008 | Hotelling |
| 2008/0211813 | A1 | 9/2008 | Jamwal et al. |
| 2008/0211832 | A1 | 9/2008 | Kumon |
| 2008/0218434 | A1 | 9/2008 | Kelly et al. |
| 2008/0250985 | A1* | 10/2008 | Hall ............................ 108/50.11 |
| 2008/0284729 | A1 | 11/2008 | Kurtenbach et al. |
| 2009/0135135 | A1 | 5/2009 | Tsurumi |
| 2009/0195513 | A1 | 8/2009 | Dybalski et al. |
| 2009/0288889 | A1 | 11/2009 | Carlvik et al. |
| 2009/0298548 | A1 | 12/2009 | Kim et al. |
| 2010/0007613 | A1 | 1/2010 | Costa |
| 2010/0035658 | A1 | 2/2010 | Lee |
| 2010/0045569 | A1 | 2/2010 | Estevez et al. |
| 2010/0053151 | A1 | 3/2010 | Marti et al. |
| 2010/0073404 | A1 | 3/2010 | Brown et al. |
| 2010/0087229 | A1 | 4/2010 | Maatta |
| 2010/0097293 | A1* | 4/2010 | McMahon ..................... 345/1.1 |
| 2010/0107099 | A1 | 4/2010 | Frazier et al. |
| 2010/0138766 | A1 | 6/2010 | Nakajima |
| 2010/0153313 | A1 | 6/2010 | Baldwin et al. |
| 2010/0164959 | A1 | 7/2010 | Brown et al. |
| 2010/0177035 | A1 | 7/2010 | Schowengerdt et al. |
| 2010/0207888 | A1 | 8/2010 | Camiel |
| 2010/0253593 | A1 | 10/2010 | Seder et al. |
| 2010/0277439 | A1* | 11/2010 | Charlier et al. ............... 345/176 |
| 2010/0287500 | A1 | 11/2010 | Whitlow et al. |
| 2011/0018913 | A1* | 1/2011 | Nittou ........................... 345/690 |
| 2011/0242750 | A1* | 10/2011 | Oakley ..................... 361/679.27 |
| 2012/0098761 | A1* | 4/2012 | Mitchell et al. ............... 345/173 |
| 2012/0098806 | A1* | 4/2012 | Samadani et al. ............. 345/207 |
| 2012/0102438 | A1* | 4/2012 | Robinson et al. .............. 715/863 |
| 2012/0102439 | A1* | 4/2012 | Mitchell et al. ............... 715/863 |

OTHER PUBLICATIONS http://www.youtube.com/watch?v=V4VYj1Y3Pg20&feature=related > Publication Date: Jul. 12, 2008 ~ video ~ ART-ToolKirt ARDeskTop ~ No Copy to Be Sent.

N. R. Hedley et al., "Explorations in the use of augmented reality for geographic visualization," Presence: Teleoperators and Virtual Environments-Mixed Reality Journals, vol. 11, issue 2, Apr. 2002, pp. 119-133.

D. Wigdor et al., "LucidTouch: A see-through mobile device," Proceedings of UST'07, Oct. 7-10, 2007, Newport, RI.

Nishina et al., "Photometric Registration by Adaptive High Dynamic Range Image Generation for Augmented Reality", IEEE Int'l Symp Mixed & Augmented Reality, Sep. 2008, 4 pgs.

International Search Report and Written Opinion in parent PCT patent application PCT/US2010/053860, dated Jul. 29, 2011.

* cited by examiner

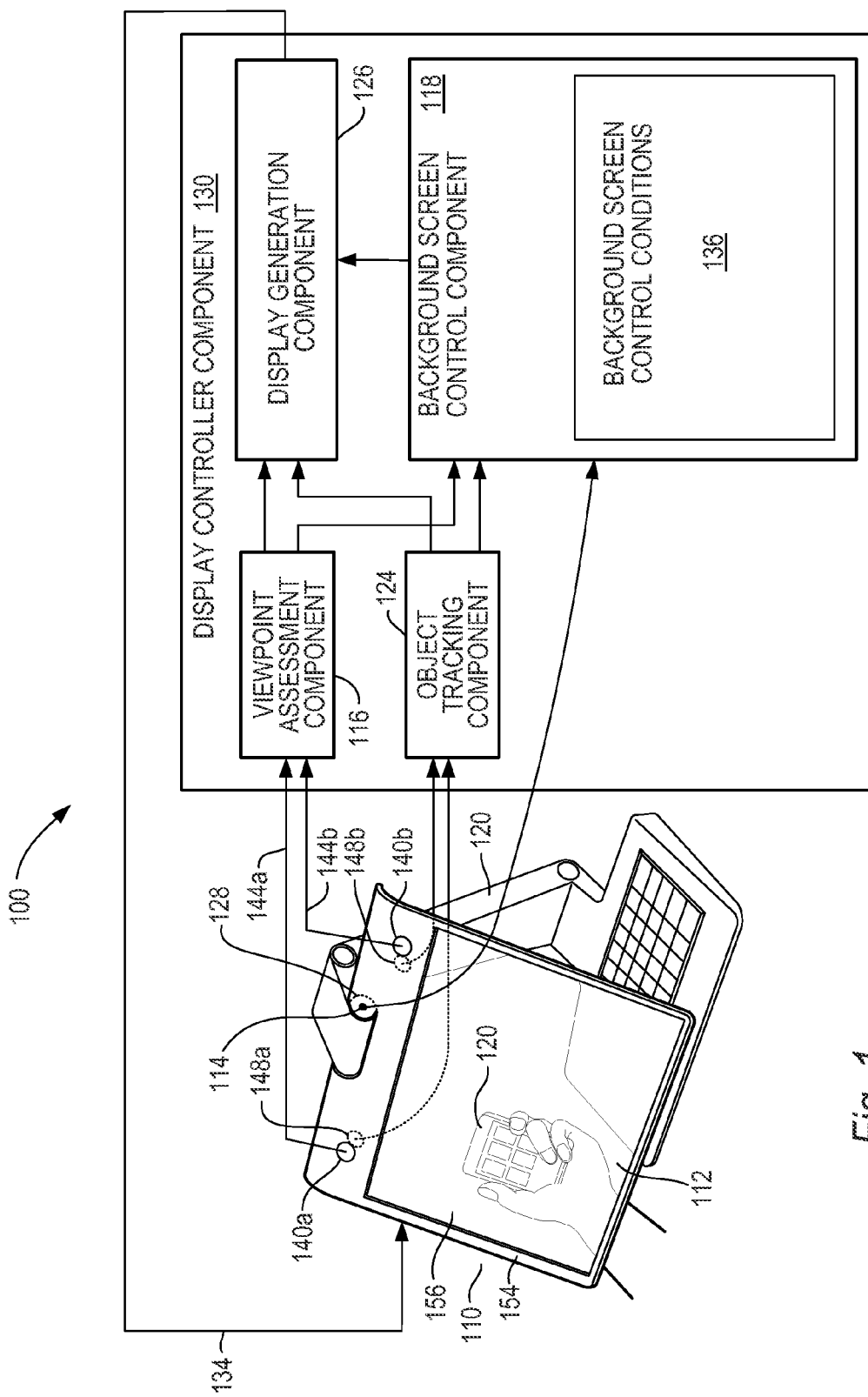

US 8,854,802 B2

DISPLAY WITH ROTATABLE DISPLAY SCREEN

CROSS-REFERENCE TO RELATED APPLICATION

This case is a continuation in part of the case entitled "An Augmented Reality Display System and Method of Display" filed on Oct. 22, 2010, having serial number PCT/US2010/053860, which is hereby incorporated by reference in its entirety. In addition this case is related to the case entitled "Display System and Method of Display for Supporting Multiple Display Modes" filed on Jan. 11, 2011, having Ser. No. 13/004,193, which is hereby incorporated by reference in its entirety.

BACKGROUND

A wide variety of displays for computer systems are available. Often display systems display content on an opaque background screen. However, systems are available which display content on a transparent background screen. There is software available which recognizes the rotation of display screen. This software can present content differently dependent on the viewing angles and user interface orientations dependent upon how the user is holding or has rotated a display. There are also displays for some computer systems that allow the display screen to be moved between a substantially vertical viewing position into a second writing position which allows writing on the display screen surface.

BRIEF DESCRIPTION OF DRAWINGS

The figures depict implementations/embodiments of the invention and not the invention itself. Some embodiments are described, by way of example, with respect to the following Figures.

FIG. 1 illustrates a block diagram of a front view of a display screen in an display system with an object positioned behind the display screen according to an embodiment of the invention;

Figure 2A:
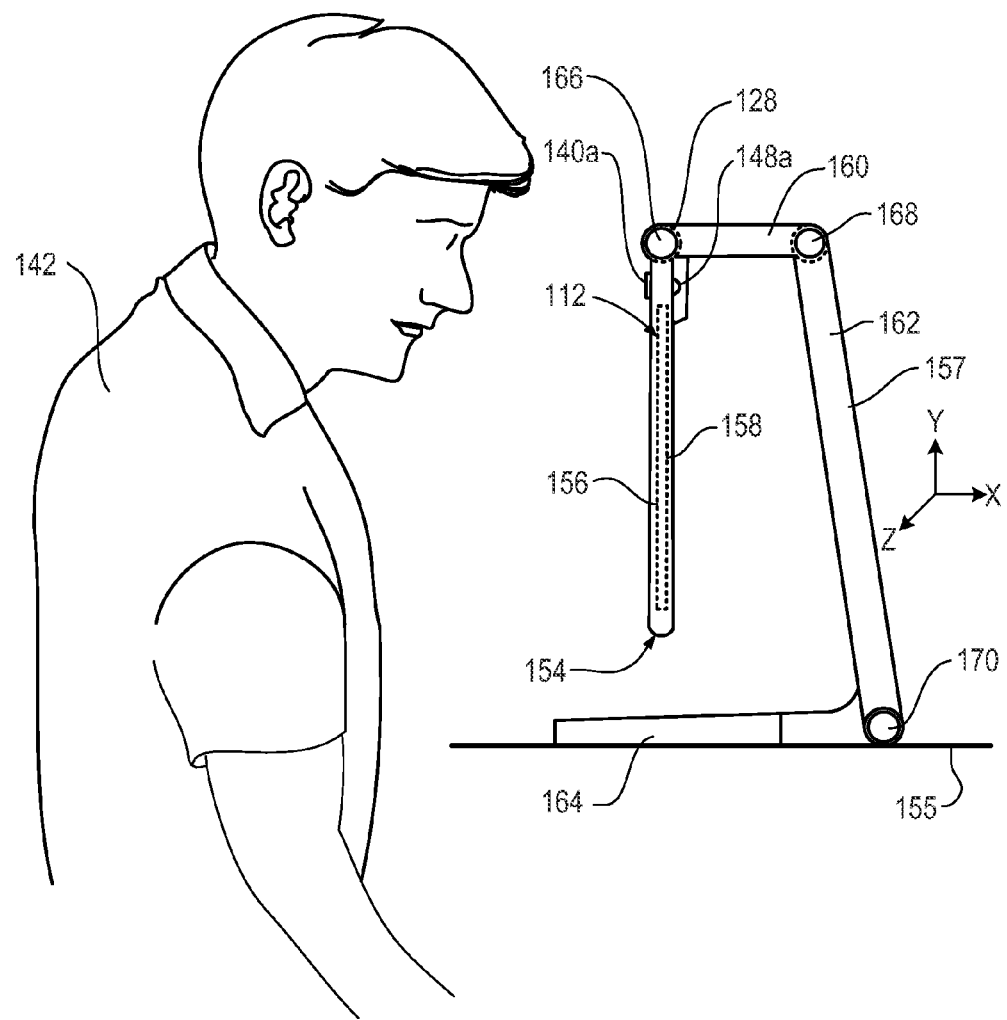
FIG. 2A shows a side perspective view of a display with a single surface viewing display screen where the display screen is positioned in a first substantially vertical viewing position according to an embodiment of the invention.

The drawings referred to in this Brief Description should not be understood as being drawn to scale unless specifically noted.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

The present invention is a display comprising: a rotatable display screen 112, the rotatable display screen 112 having a first surface 156 and a second surface, the rotatable display screen 112 for operating in at least a transparent background screen mode and an opaque background screen mode; and a support structure 157 for supporting the rotatable display screen 112 in at least a first position and a second position. The present invention describes a display stand and details the display stand mechanisms. The display stand is a support structure capable of supporting a rotatable display screen and for moving the display screen into different viewing positions that correspond to different operational or usage modes.

The display is flexible in that it is capable of supporting multiple operational modes and can in addition move through multiple positions. In one embodiment, different modes of operation are dependent upon different display screen positions or predefined user interaction. For example, in one embodiment the display screen 112 operates in an opaque background screen mode in a first substantially vertical viewing position and a transparent background screen mode in a second thru-screen viewing position.

FIG. 1 illustrates a block diagram of a front view of a display screen in a display system 110 with an object 120 positioned behind the display screen according to an embodiment of the invention. The display 110 includes a rotatable display screen 112 for operating in at least a first background screen mode and a second background screen mode, where at least one of the background screen modes supports a transparent background.

In one example, the display system 100 includes a viewpoint assessment component 116 to determine a viewpoint of a user positioned in front the display screen 112, and an object tracking component 124 capable of tracking the user manipulation of an object 120 positioned behind the display screen 112. Data from the viewpoint assessment sensors 140*a*, 140*b* and object tracking sensors 148*a*, 148*b* is input to the viewpoint assessment component 116 and object tracking component 124, respectively. The display system can also include a display generation component 126. Based on data from the viewpoint assessment component 116 and data from the object tracking component 124, the display generation component 126 creates content for the display on the display screen 112. The display controller component 130 outputs data 134 from at least the display generation component 126 to the display screen 112.

In the embodiment shown in FIG. 1, the display system includes a background screen control component 118 for processing information from the at least one sensor 114, wherein based on the background screen control sensor data from the at least one background screen control sensor 114 a determination is made whether a background screen control condition 136 has been met, wherein responsive to the determination that the background screen control condition 136 has been met, the background of the display screen 112 is changed.

Figure 2B:
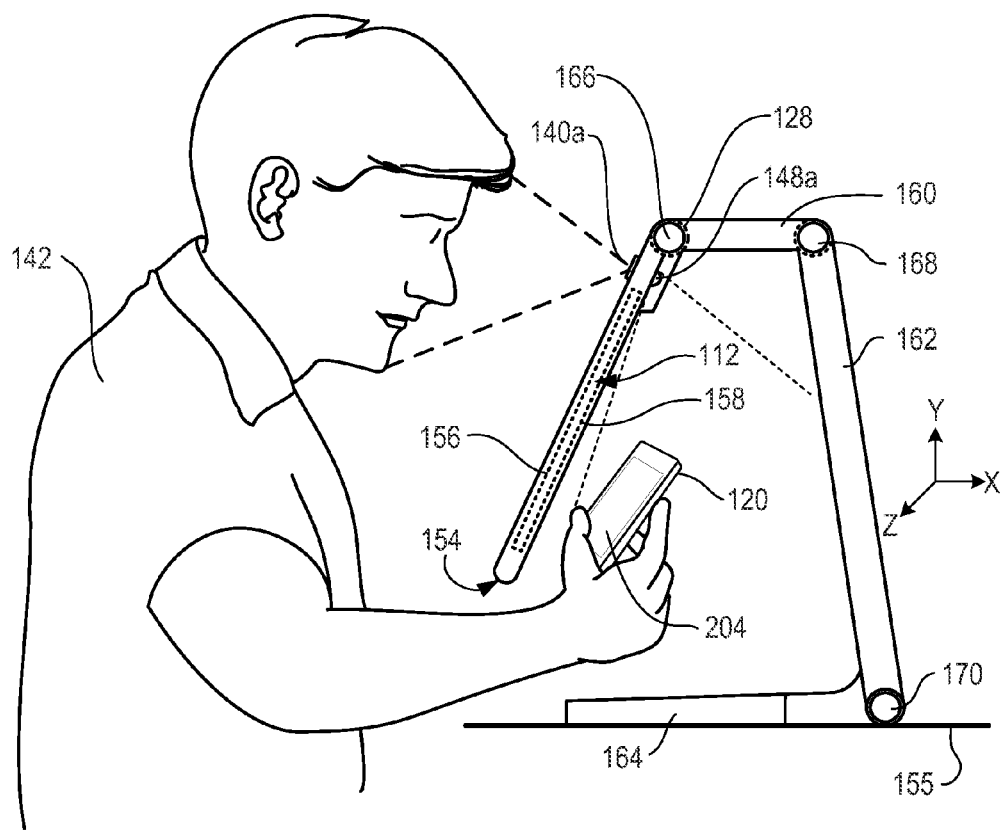
FIG. 2B shows a side perspective view of a display with a single surface viewing display screen operating with the display screen positioned in a second "thru-screen" position according to an embodiment of the invention.

As previously described, in one example the display screen 112 is capable of switching between a first opaque display mode and a second transparent display mode. Referring to FIGS. 2A and 2B, the display screen 112 has a first surface 156 and a second surface 158. However, unlike conventional displays where the second surface is encased or obscured by an opaque structure (i.e., the back of the display stand), in the example shown, the second surface of the display screen is open or exposed so that it can be seen or is viewable by the user. In the transparent background screen display mode—the background screen upon which content is displayed would be transparent. FIG. 23 shows the thru-screen mode, a mode where the display screen background screen is transparent and objects can be viewed "thru" the transparent display screen. A transparent background screen allows the user to see and interact with an object or device positioned behind the display screen.

In one embodiment, the transparent screen is implemented using a transparent OLED (organic light emitting diode screen). A display screen capable of switching between two modes could be implemented in one embodiment as a transparent OLED (organic light emitting diode) screen with a liquid crystal shutter positioned behind the OLED screen. In a first mode the display screen would appear to be opaque (liquid crystal shutter behind the display screen closed) for use as a conventional display. In a second mode the transparent LED screen would be transparent (liquid crystal shutter open).

Details regarding a transparent thru-screen type display system and interacting with an object or device positioned behind the display screen is described in more detail in the pending patent applications entitled "An Augmented Reality Display System and Method of Display" filed on Oct. 22, 2010, having serial number PCT/US2010/053860 and the case entitled "Display System and Method of Displaying Based on Device Interactions" filed on Oct. 29, 2010, having Ser. No. 12/915,311, which are both hereby incorporated by reference in its entirety.

FIG. 2A shows a side perspective view of a display with the display screen positioned in a first substantially vertical viewing position. FIG. 2B shows a side perspective view of a display with the display screen positioned in a second "thru-screen" position. Although in general, the discussions with respect to this application describe the display in a first position operating with an opaque background screen and in a second position operating with a transparent background screen, this description is for purposes of example. In an alternative example, the display screen could operate with a transparent background screen in the first position or with an opaque background screen in the second position. The display screen should be capable of supporting different background screen modes, at least a transparent background screen and an opaque background screen.

The example shown in FIG. 2A shows the first surface facing the user in a first position. In the embodiment shown, the user is viewing the display screen in an opaque background mode. In the embodiment shown in FIG. 2B, the display screen is rotated into a second position. In the embodiment shown in FIGS. 2A and 2B, the display screen is in a transparent mode or thru screen mode where the user interacts with an object behind the display screen.

Referring to FIG. 2A, the display stand 157 includes three different members: a first display support member 160, a second display support member 162, and a third display support member 164. In the example shown, the three display support members are substantially linear. In the example shown, the first display support member 160 is mechanically coupled to the display frame 154 by a first rotational component 166.

In the example shown in FIGS. 2A and 2B, the movement of the display screen 112 to the second position shown in FIG. 2B provides the user additional space behind the screen to interact with an object. The first display support member 160 functions as a display adjustment member for moving the display screen 112 around the axis of rotation of the first rotational component 166. The second display support member 162 is mechanically coupled to the first display support structure 160 by a second rotational component 168. Further, the second display support member 162 is mechanically coupled to a third display support member 164 by a third rotational component 170.

In the example shown in FIG. 2A, the three rotational components 166, 168, 170 provide the ability to adjust the display screen to the position desired by the user. The type and number of rotational components used may vary dependent upon the design constraints of the manufacturer. In FIG. 2A, the rotational components are hinges, however, other structures which provide the ability to rotate, pivot or move in space around an axis may be used. Dependent upon the type of rotational component used—the rotational component may have one to three degrees of freedom in rotation.

In one example, the rotational components include a locking mechanism so that the rotational component stays in the locked position until moved by the user. In another example, the locking mechanism locks when the user stops the motion. In another example, the user uses a physical indication (i.e., pushes a button, moves a latch) to indicate when they wish the position of the display support member it is coupled to.

As previously stated, in the embodiment shown in FIG. 2A there are three rotational components 166, 168, 170 for providing flexibility with respect to the position of the display screen 112 relative to the user 142. For example, the first rotational component 166 is used to adjust the position of the display screen around the axis of rotation of the hinge to move the display screen 112 closer or further away from the user. The second rotational component 168 may be used to move the display screen vertically (along the y axis)—higher up or lower relative to the user. The third rotational component 170 may be used to move the display screen 112 horizontally (along the x axis) closer or further away from the user.

In one embodiment, the display stand 157 does not include a second rotational 168 and/or the third rotational components 170. In this example, there is a first rotational component 166 between both the display screen frame and the first display support member—but no other rotational component. In other words, the structure of the display stand would be a single integrated mechanical structure. In this embodiment, the first display support member, the second display member and the third display support member would all be replaced by a single display support member. Although this example would provide less movement flexibility to the user, the at least one rotational component would still allow the display screen to move into a second position that the user could reach behind in the thru screen mode.

In the example shown in FIG. 2A, the display screen is rotatable around a first rotational element. In the embodiments described in this application, both sides or surfaces of the display screen 156, 158 are substantially open and exposed to the viewer. The display screen is obscured by the display stand only to the extent that the display screen bezel or frame overlaps the display screen. However, although both sides of the display screen are exposed, in the configuration shown in FIGS. 2A and 2B, for example, the user only views the display screen from the first surface 156. In other words, the display screen in the display shown in FIGS. 2A and 2B has only a single viewing surface. Although the first rotational component would allow the rotation to a position where the second surface of the display screen would be closest to the user this is not the preferred configuration described with respect to display shown in FIGS. 2A and 2B.

In the examples shown in FIGS. 2A-2B and 3A-3B, the first surface 156 (or viewing surface) of the display screen is always the surface closest to the user. By the term "closest to the user," we mean closest to a user's face viewing the display screen. This is in contrast to the embodiments shown in FIGS. 4A-4B and 5A-5B where dependent upon the degree of rotation, the second display surface 158 may also be the display screen surface closest to the user.

Although the display screen in FIGS. 2A and 2B is rotatable, in one example the range of rotation is limited so that the display screen surface is always the display screen surface physically closest to the user's face—the viewing surface. Assuming the first position shown in FIG. 2A, the display screen 112 is aligned with the xyz axis so that the display screen is aligned approximately with the y axis assuming that the first rotational component (or hinge) is at the origin (0,0, 0). Then for example shown, the display screen axis from the origin to the base of the display screen is at approximately 270 degrees with respect to the x axis shown. Referring to FIG. 2B, when the rotatable display screen 112 is rotated to a second position (moved approximately 15 to 20 degrees), so that the display screen axis is at approximately 255 degrees. The rotation to the second position is to allow for more room for the user to interact with an object behind the screen. The range of rotation may vary based upon the position of the user. For example if the user is standing—the display might be rotated out further so that the user can more easily view the object behind the screen.

In the example shown in FIGS. 2A and 2B, a second display screen support member 162 is mechanically coupled to both a first display screen support member and a third display screen support member. In the example shown, the second display screen support member can be described as substantially vertical (along the y axis) or substantially perpendicular to the surface 155. The second display support member should be of sufficient thickness and weight that in combination with the third display support member—it can support at least the display screen 112 and the first rotational element 166.

In one example, the third display support member 164 is a flat member used for providing a stable base for the display on a surface 155. Further, the third display support member 164 provides support for the second display support member 162 and the first display support member 160. In one example, the third support member 164 is separate from the second support member 162. In an alternative example, the second display support member 162 and third display support member 164 form a single rigid structure without a third rotational component 170. The third display support member 164 provides support and in one example is weighted or lengthened to provide additional stability for the first and second display support members and the display screen.

Figure 3A:
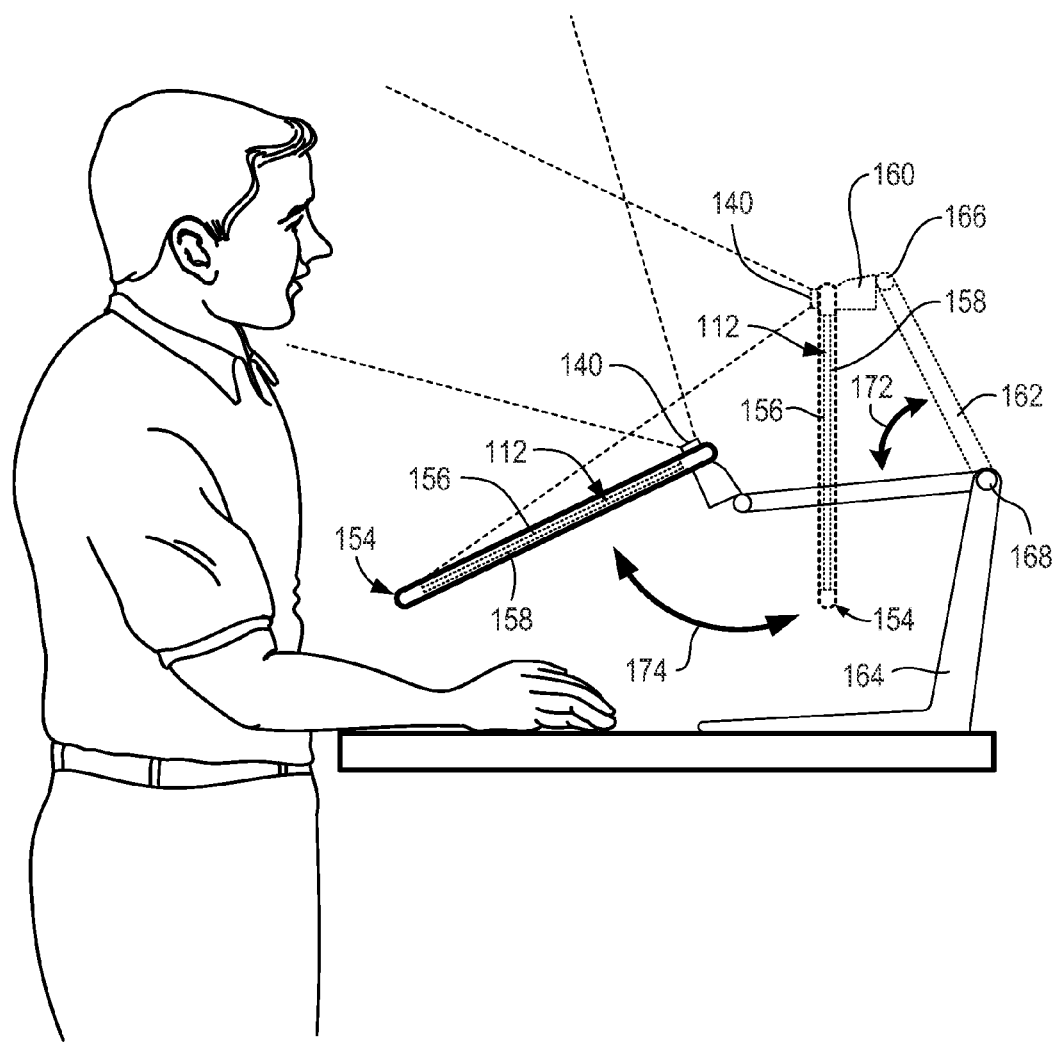
FIG. 3A shows a side perspective view of a display with a single surface viewing display screen where the display screen is positioned in both a first substantially vertical viewing position and second "thru-screen" viewing position according to an embodiment of the invention.
Figure 3B:
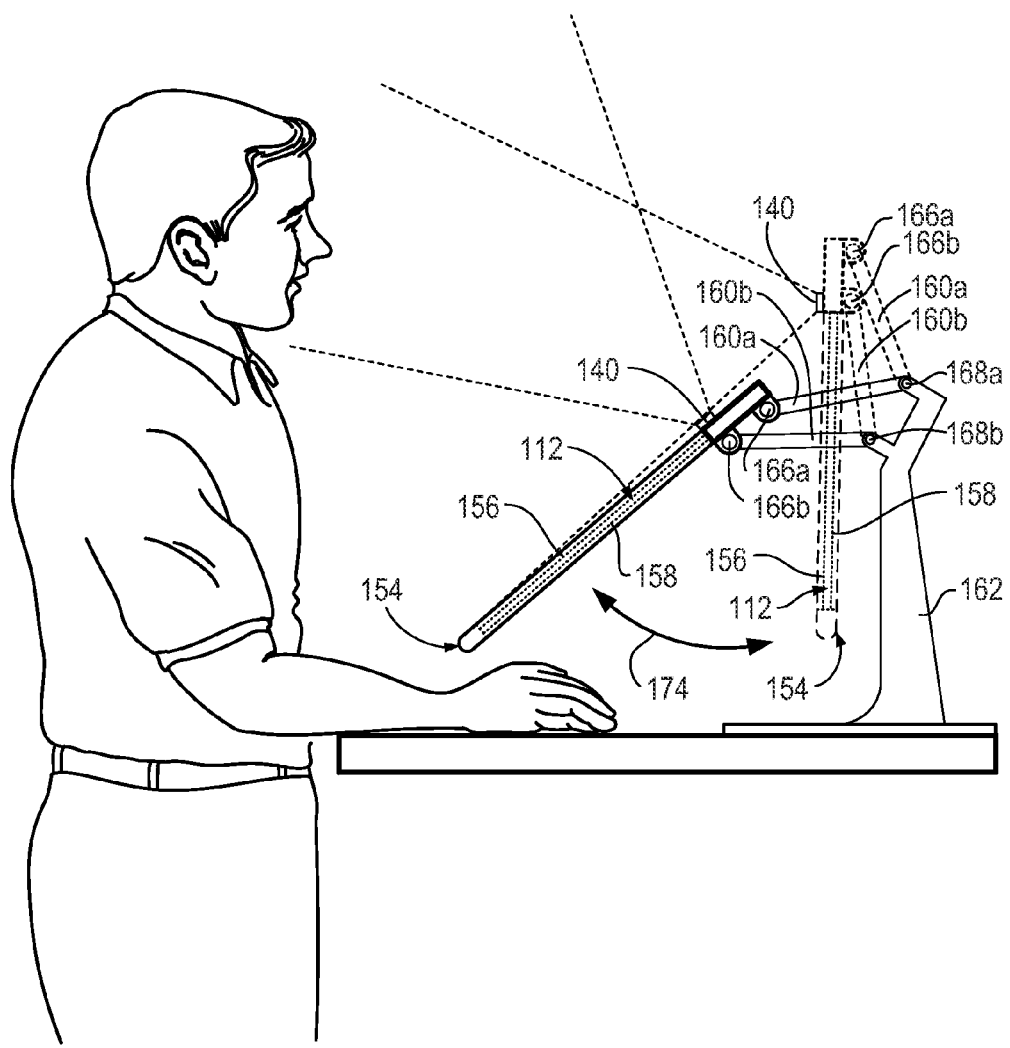
FIG. 3B shows a side perspective view of a display with a single surface viewing display screen where the display screen is positioned in both a first substantially vertical viewing position and a second "thru-screen" viewing position according to an embodiment of the invention.

FIG. 3A shows a side perspective view of a display with a single surface viewing display screen. In FIG. 3A, the display screen is shown positioned in both a first substantially vertical viewing position and second thru-screen viewing position. FIG. 3B shows an alternative implementation of the display shown in FIG. 3A. In both the embodiments shown in FIGS. 3A and 3B, the elements of the display in the first position is shown by a dotted line outline while in the second position, the elements of the display are shown represented by a solid line outline of the elements.

Similar to FIG. 3A, FIG. 3B shows a side perspective view of a display with a single surface viewing display screen where the display screen is shown positioned in both a first substantially vertical viewing position and a second thru-screen viewing position. Compared to the embodiment shown in FIGS. 2A-2B, the embodiment shown in FIG. 3A decreases the number of rotational elements (hinge points) per display support structure that are necessary to support the two usage positions of the display screen. In the embodiment shown in FIG. 3B a second linkage is added roughly parallel to the first in order to constrain the motion of the displays between the two positions.

Referring to the embodiment shown in FIG. 3A, the display includes a first display support member 160, a second display support member 162, and a third display support member 164. In the example shown, the first display support member 160 is mechanically coupled to the display frame. The first rotational component 166 mechanically couples the first display support member 160 to the second display support member 162. A second rotational element 168 mechanically couples the second display support member 162 to a third display support member 164.

Although in the description, the structure 160 between the frame and the first rotational component is described as a first display support member, it could be referred to as part of the frame of the display. In this case, the display could be described as including an extended display frame 160 mechanically coupled to a first rotational component 166, a first rotational component 166 mechanically coupled to a first display support member 162 and a second rotational component 168, and a second rotational component 168 mechanically coupled to a second display support member 164.

The display stand includes at least a first rotational component 166 and a second rotational component 168, the second rotational component 168 for adjusting the height of the display screen 112. Referring to FIG. 3A, in the first position the display screen is at a first height. In the second position, the display screen is at a second height. Referring to the example shown in FIG. 3A, the display screen 112 is shown in a first position where the first rotational element 166 is higher than the second rotational element 168 and the second support structure and correspondingly the display screen 112 are substantially vertical. The first position provides a conventional viewing mode—where the display screen 112 is substantially vertical typically with an opaque background screen.

The display in FIG. 3A is moved between a first position to a second position. The arrow 172 is used to show the movement of the second display support member 162 between a first position (shown with dotted lines) to the second position (shown with solid lines). When the display screen is in the second position, the display screen 112 is at a lower height (a second height) compared to the first position. Compared to the first position (substantially vertical), the second position is substantially horizontal. This second comparatively horizontal position allows the user more area beneath the display screen to interact with an object. It also brings the screen closer to the user so that the area behind the screen is within a comfortable reaching distance. This is important when the display is in the thru-screen viewing mode with a transparent background screen.

Referring to FIG. 3A, the second arrow 174 is meant to show the rotation of the display screen from its first position to its second position. The arrow 174 shows the change of the display between a substantially vertical orientation to a second substantially horizontal orientation. The rotation of the display screen around the first rotation component 166 allows the display screen to be pulled further out closer to the user and allows more space behind the display screen for the user to interact with objects.

Both of the displays shown in FIGS. 3A and 3B are similar to the displays shown in FIGS. 2A and 2B in that the configurations shown in the listed Figures are described with respect to having a single surface viewing display screen. This works well with having the user viewpoint sensing capability fixed with respect to the display screen and configured to support both modes of operation corresponding to an opaque background screen and an a transparent background screen. For modes supported by an opaque background screen, this can enable an auto-stereo type functionality.

FIG. 3B shows a side perspective view of an alternative display system to the display system shown in FIG. 3A. Similar to the example shown in FIG. 3A, the example shown in FIG. 3B includes a display screen capable of moving between a first position having a first height and a second position having a second height. In contrast to the example shown in FIG. 3A where a single rotational component is used between the first display support member and the display screen, for example, a plurality of rotational elements (shown rotational element pairs—two hinges) are provided. In addition, a corresponding support structure pair is used to attach or otherwise mechanically couple each of the rotational pairs coupled to the frame of the display screen to their corresponding support members.

In the example shown in FIG. 3B, a first rotational element pair 166a, 166b mechanically couples the frame 154 of the rotatable display screen to a first display support member pair 160a, 160b. In the example shown in FIG. 3B, a second display support member 162 is used to provide a display base and also to support to the first display support member pairs and display screen. The second display support member is mechanically coupled to the first display support member pair 160a, 160b by second rotational component pair 168a, 168b. The replacement of a single support member with a pair of support members and their rotational component constrains the motion of the display screen to a single arc compared to the example shown in FIG. 3A. This simplifies the process of moving between the two screen positions and allows the use of a single locking component to hold the screen in place.

Figure 4A:
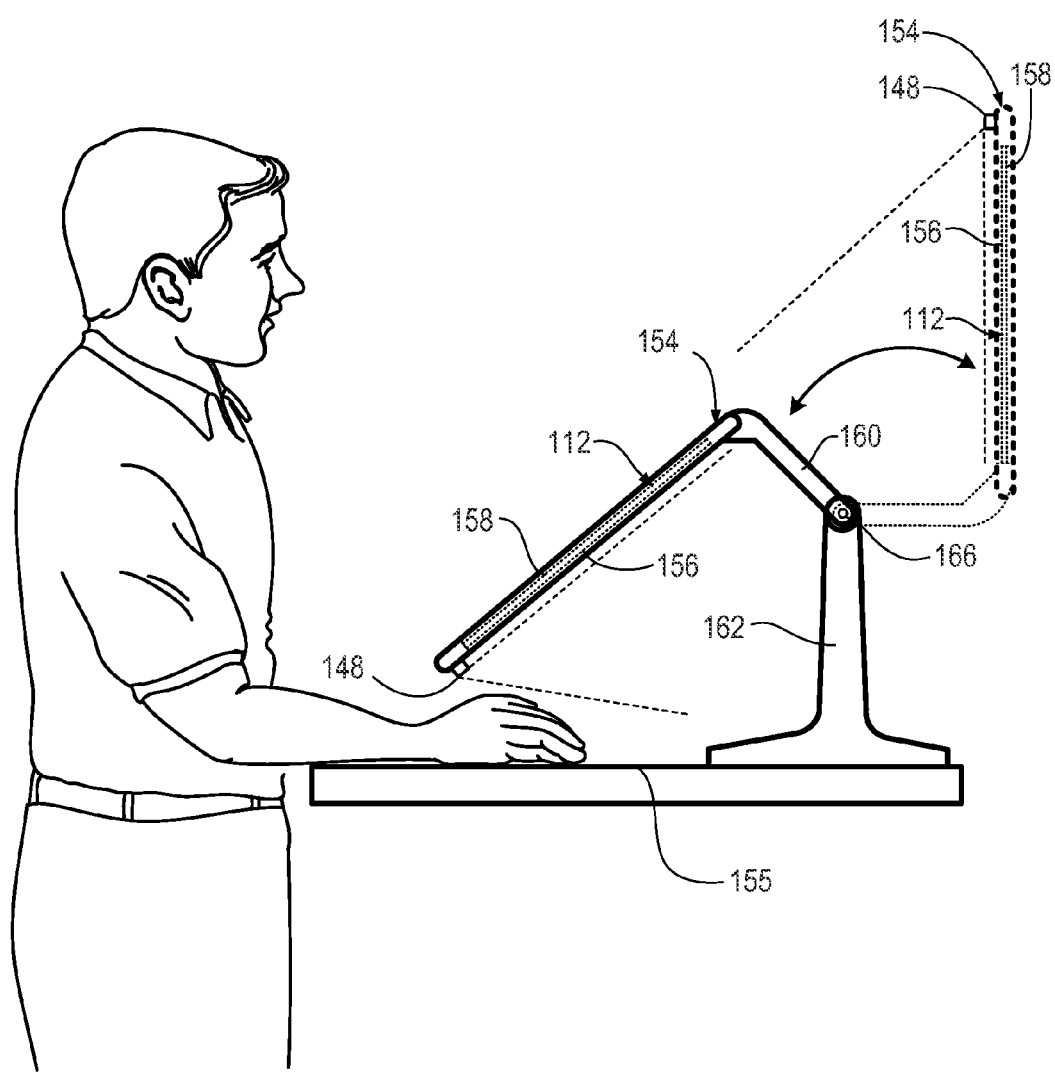
FIG. 4A shows a side perspective view of a display with a rotatable dual screen viewing surface in both a first substantially vertical viewing position and second "thru-screen" position where according to an embodiment of the invention.

FIG. 4A shows a side perspective view of a display with a rotatable dual screen viewing surface in both a first substantially vertical viewing position (shown with dotted lines) and second thru-screen position (shown with solid lines) according to an embodiment of the invention. FIG. 43 shows a front perspective view of the display in FIG. 4A with the display screen positioned in the second "thru-screen" viewing position according to an embodiment of the invention. The main differences between the embodiments shown in FIGS. 4A-4B and 5A-5B and the previously described embodiments is that the embodiments in FIGS. 4A-4B and 5A-5B include rotatable dual screen viewing surface where the user can potentially interact with either or both surfaces of the display screen.

The term viewing surface refers to the display surface closest to the user's face or eyes for viewing the display screen. The rotatable display screen in shown in FIGS. 4A-4B and 5A-5B rotates between a first position where the first surface 156 of the display screen is the closest to the user and a second position where the second surface 158 of the display screen is the display surface closest to the user.

Referring to FIG. 4A shows a display that includes a frame around the periphery of the rotatable display screen 112, the frame being mechanically coupled to a first display support member 160. In one example, the frame around the periphery of the rotatable display screen and the first display support member 160 are a single integrated structure formed from a single material, such as a rigid plastic material. In another example, the frame around the periphery of the rotate display screen and the first support member are two separate structures that are adhered or fastened together.

In one example, the first display support member is mechanically coupled to a first rotational component 166 that allows the display screen 112 to rotate around the first rotational component 166. Further, the first rotational component 166 is also mechanically coupled to a second display support member 162 which in the embodiment shown in FIG. 4A, acts as a base and provides support for the display screen.

Referring to FIG. 4A illustrates the movement of the rotatable display screen from a first position to a second position. For purposes of discussion, assume that in the first position (display screen shown in phantom) the display screen operates with an opaque background screen and in the second position, operates with a transparent background screen. Although movement from the first position to the second position by rotating the display screen around the first rotational component compares similarly to the method for changing position described with respect to FIGS. 2A-2B and 3A-3B, the range of rotation that the display screen rotates through is often larger since it results in flipping the viewing surface from the first surface 156 of the rotatable display to the second surface 158 of the rotatable display.

Viewable from either surface means that the content displayed is viewable in the orientation/format originally presented. In other words, content written on a transparent screen would not be considered "viewable" if text presented when viewed was viewed, for example, upside down or backwards. Because the data on the display screen is inverted when the viewing surface of the display screen is inverted, changing the viewing surface of the display screen triggers inverting the displayed content. In one example, the position of the hinges can be used to trigger the display screen inverting its contents.

In the configurations shown in FIGS. 2A-2B, 3A-3B and 6A-6B, since only a first surface 156 faces the user, it is only necessary that the display screen be viewable from single direction. In the example shown in FIGS. 4A and 4B, the display screen 112 is preferably viewable from both sides.

This means that the user can interact with a transparent background screen in either the first position (viewable surface 156) or the second position (viewable surface 158). In one example, a display screen that is viewable from both sides is implemented using display electrodes that are transparent in addition to a transparent display material.

This dual viewing surface configuration fits well with having the gesture/object sensing capability fixed with respect to the viewing surface of the screen, and is usable in both the opaque background screen mode and the transparent background screen mode. In the transparent thru-screen mode, the sensors 148 monitor the space behind the display screen indicated by the dotted lines extending from the sensor. In the conventional monitor mode, the sensors monitor the space bounded by the dotted lines extending from the sensor 148 in front of the screen.

Figure 4B:
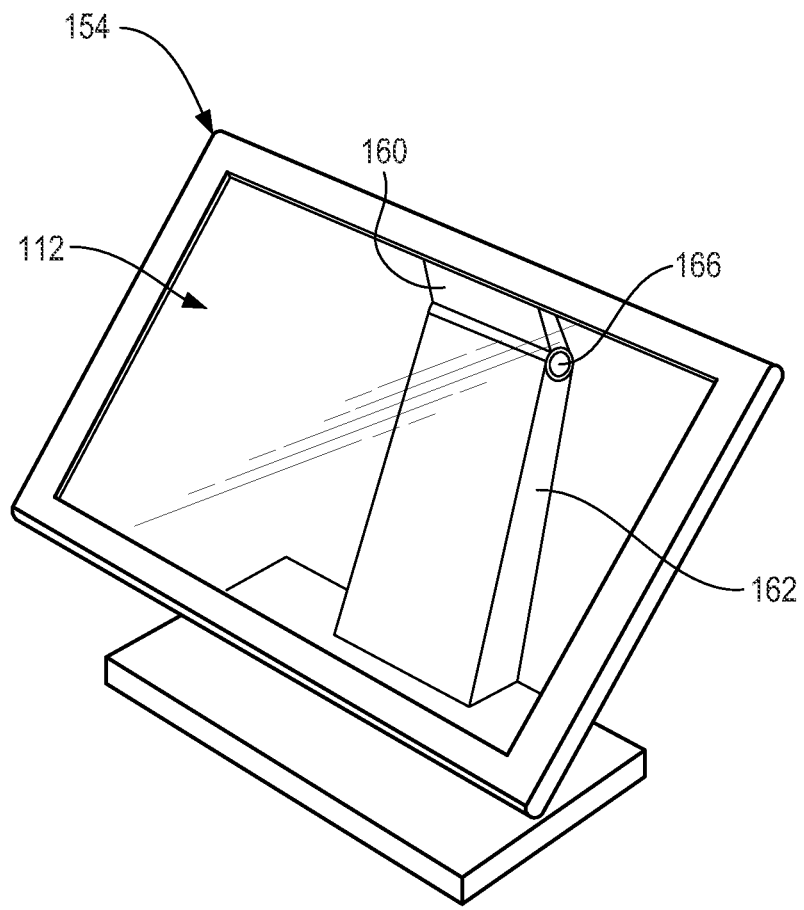
FIG. 4B shows a front perspective view of the display in FIG. 4A with the display screen positioned in the second "thru-screen" viewing position according to an embodiment of the invention.
Figure 5A:
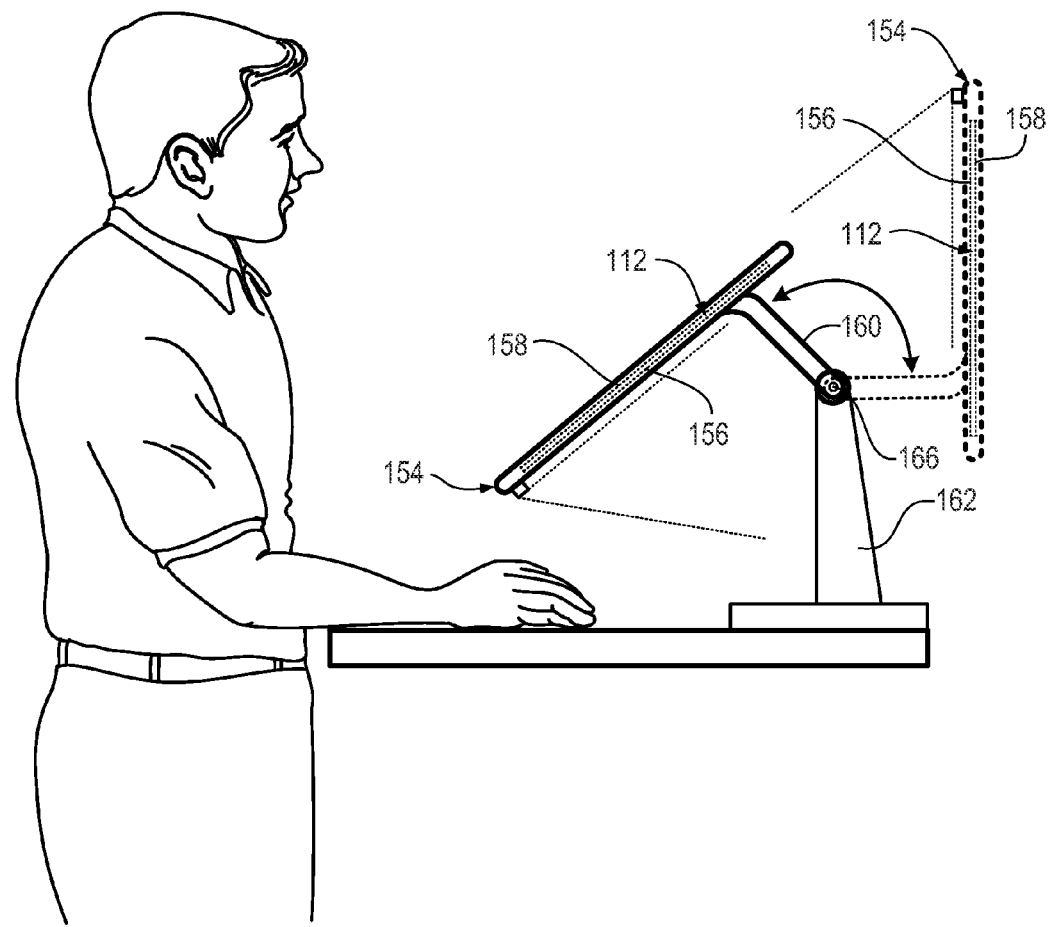
FIG. 5A shows a side perspective view of a display with a rotatable dual screen viewing surface in both a first substantially vertical viewing position and a second "thru-screen" viewing position where according to an embodiment of the invention.
Figure 5B:
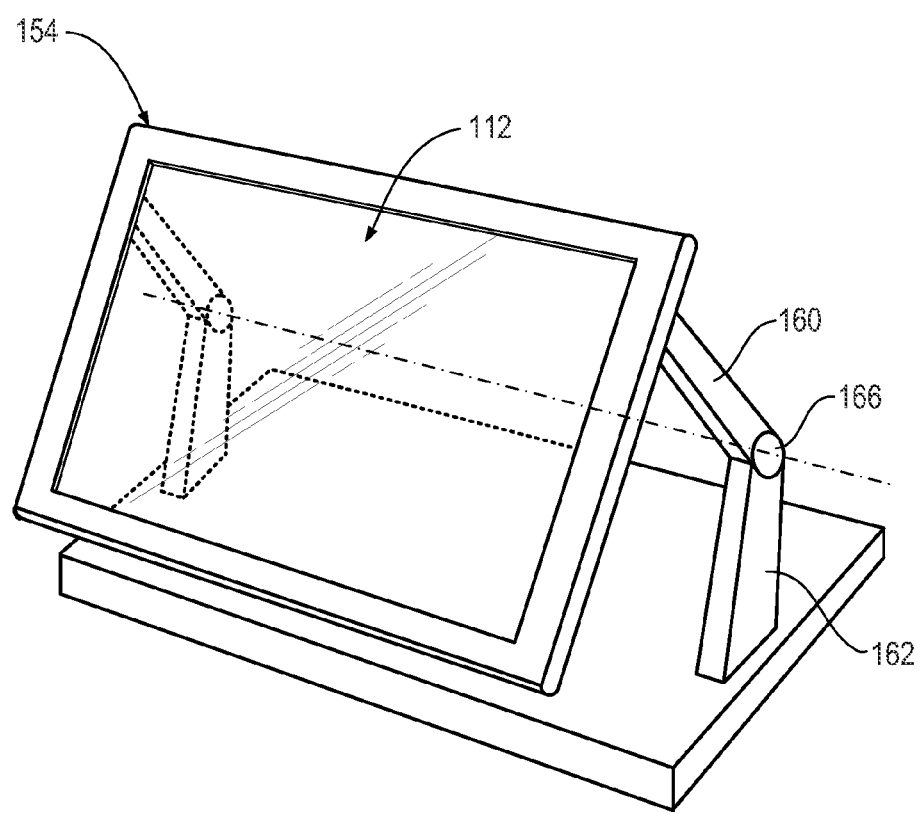
FIG. 5B shows a front perspective view of the display in FIG. 5A with the display screen positioned in the second "thru-screen" viewing position according to an embodiment of the invention.

FIG. 5A shows a side view of a display with a rotatable dual screen viewing surface in both a first substantially vertical viewing position and a second thru-screen viewing position where according to an embodiment of the invention. FIG. 5B shows a front perspective view of the display in FIG. 5A with the display screen positioned in the second "thru-screen" viewing position. Both the embodiment shown in FIGS. 4A-4B and 5A-5B show rotatable dual screen viewing surface where the viewing surface facing the user changes upon rotation from a first position to a second position. The difference between FIGS. 4A-4B and the embodiment shown in FIGS. 5A and 5B is that the display in FIGS. 4A-4B shows a single hinge attachment to the top of the display screen frame. In contrast, the display in FIGS. 5A-5B has dual hinge attachment to the sides of the frame around the perimeter of the display screen. The dual hinge configuration shown in FIGS. 5A-5B allows greater flexibility in positioning and allows the display to be positioned lower in monitor mode without being obscured by the first rotational component.

Figure 6A:
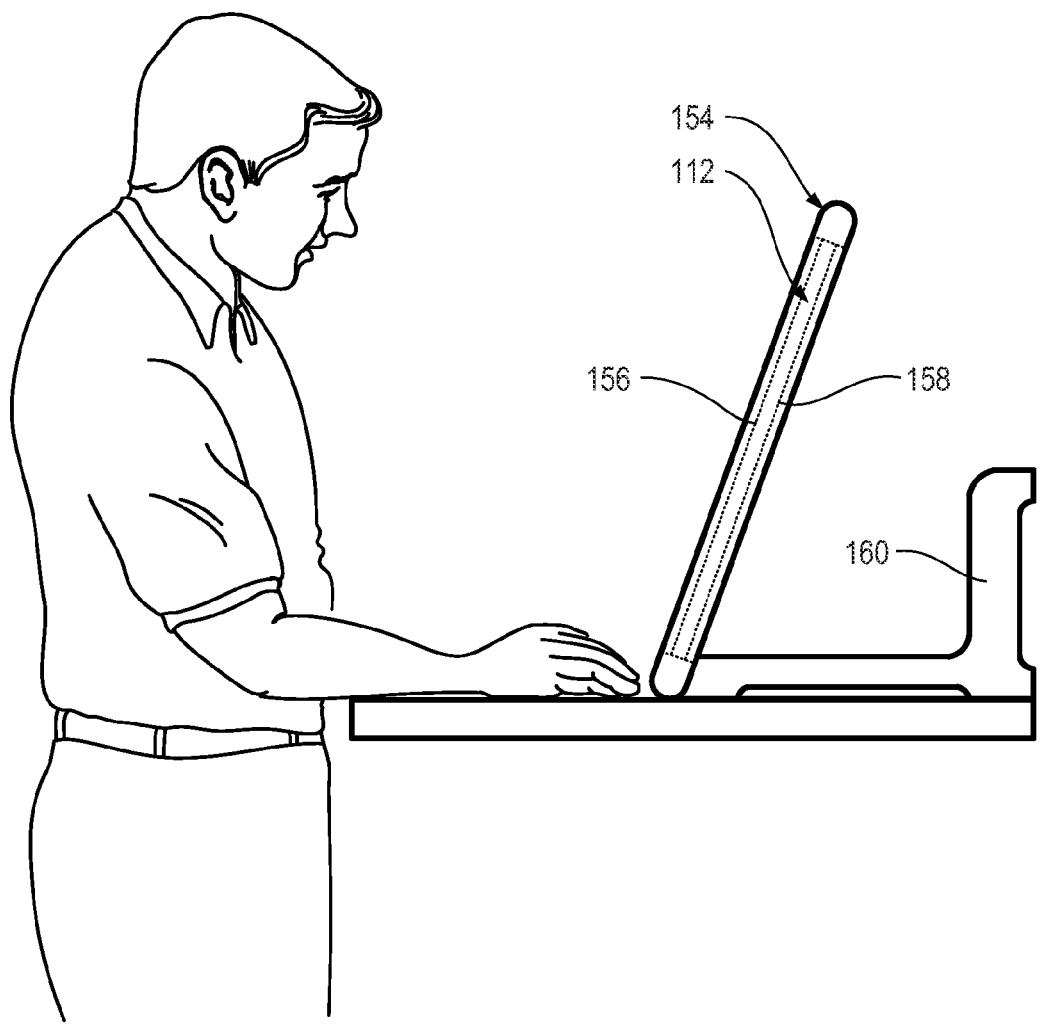
FIG. 6A shows a side view of a display with a single viewing surface display screen with the display screen positioned in a first substantially vertical viewing position.
Figure 6B:
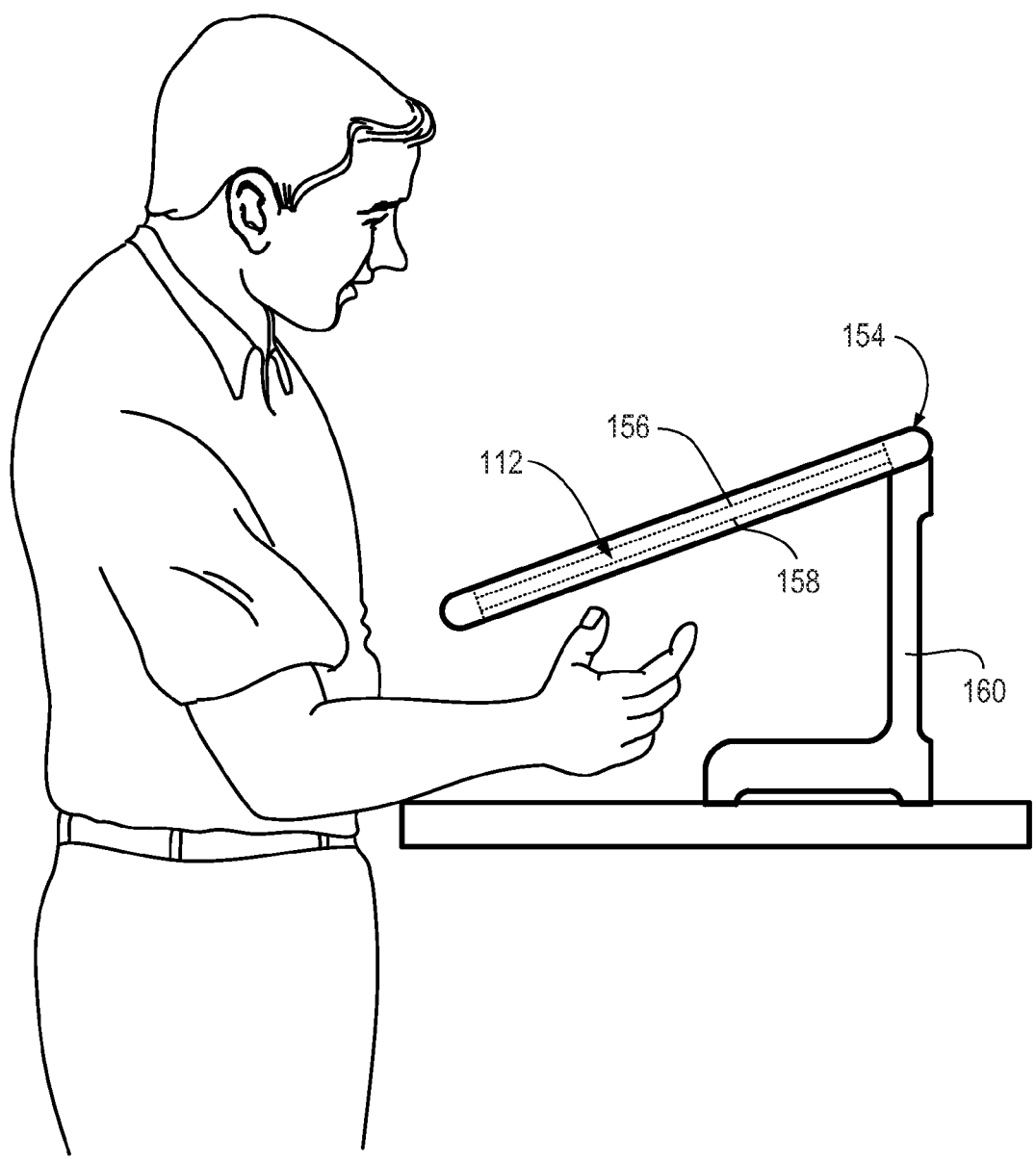
FIG. 6B shows a side view of a display with a single viewing surface display screen with the display positioned in a second "thru-screen" viewing position according to an embodiment of the invention.

FIG. 6A shows a side view of a display with a fixed stand in a first viewing position according to an embodiment of the invention. FIG. 6B shows a side view of the display shown in FIG. 6A reoriented so as to place the screen in a second viewing position according to an embodiment of the invention.

The difference between all the previous embodiments and the embodiment shown in FIGS. 6A and 6B is the method of rotation between the two positions of the display screen. For the embodiments shown in FIGS. 4A-4B and FIG. 5A-5B, rotation between the viewing surfaces between the first and second positions occurs by moving the display screen around the axis of rotation of the hinge or other rotational component. In contrast, in the embodiments shown in FIGS. 6A and 6B, rotation between the viewing surfaces occurs by picking up the support structure of the display and rotating or otherwise moving the entire display stand to the desired position. In other words, the display stand is picked up and moved in order to change the position of the display screen. It is not just the position of the display screen that changes when moving from between positions, the position of the entire support structure changes.

Both the displays shown in FIGS. 2A-2B, 3A-3B, and 6A-6B include: a rotatable display screen, the display screen having at least a first surface and a second surface, the rotatable display screen viewable from the first surface; and a support structure for supporting the rotatable display screen in at least a first and a second position. However, the embodiment in FIGS. 6A and 6B does not include a hinge, or other rotational component that allows the display screen to rotate around its axis relative to the rest of the support structure or stand. Instead, in FIGS. 6A and 6B the display screen is fixed relative to the stand or its support so that the display screen is not rotatable with respect to the display stand. The display screen shown in these FIGS. 6A-6B is rotatable, but it is rotatable by picking up the stand and moving the display screen to its alternative position.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A display comprising:
a rotatable display screen, the rotatable display screen having a first surface and a second surface, the rotatable display screen for operating in different modes of operation including at least a transparent background screen mode and an opaque background screen mode; and
a support structure for supporting the rotatable display screen in different display positions including at least a first position and a second position,
wherein the different modes of operation depend on the different display positions.

2. The display recited in claim 1 wherein the support structure includes a frame of the rotatable display screen and at least a first rotational component for mechanically coupling the frame of the rotatable display screen and the support structure.

3. The display recited in claim 2 wherein the support structure further includes at least a first display support structure, wherein the first rotational component mechanically couples the frame of the rotatable display screen and the first display support structure.

4. The display recited in claim 2 wherein the support structure further includes at least a first display support structure, wherein the frame of the rotatable display screen is mechanically coupled to the first display support structure.

5. The display recited in claim 3 further including at least a second display support structure, wherein the first rotational component mechanically couples the first display support member and the second display support member.

6. The display recited in claim 2 wherein the support structure includes at least a first display support structure and a second rotational component, the second rotational component for adjusting a height of the rotatable display screen.

7. The display recited in claim 6 wherein the first position of the rotatable display screen is at a first height and the second position of the rotatable display screen is at a second height.

8. The display recited in claim 1 wherein a viewing surface of the rotatable display screen in the first position is the first surface of the rotatable display screen and the viewing surface of the rotatable display in the second position is the second surface of the rotatable display screen.

9. The display recited in claim 2 wherein the viewing surface of the rotatable display screen in the first position is the first surface of the rotatable display screen and the viewing surface of the rotatable display in the second position is the second surface of the rotatable display screen.

10. A display, comprising:
- a rotatable display screen, the display screen having at least a first surface and a second surface, the rotatable display screen for operating in different operational modes including at least a transparent background screen mode and an opaque background screen mode; and
- a support structure for supporting the rotatable display screen in different viewing positions including at least a first position and a second position, wherein the rotatable display screen is fixed relative to the support structure,
- wherein the different viewing positions correspond to the different operational modes.

11. The display recited in claim 10 wherein the display screen is rotatable to the second position by rotating the support structure.

12. A display, comprising:
- a rotatable display screen, the display screen having at least a first surface and a second surface, the rotatable display screen having a dual viewing surface that is viewable from both the first surface and the second surface, wherein the viewing surface in a first position is the first surface of the rotatable display screen, wherein the viewing surface in a second position is the second surface of the rotatable display screen; and
- a support structure for supporting the rotatable display screen in at least the first position and the second position,
- wherein, in the first position, the rotatable display screen operates with an opaque background screen,
- wherein, in the second position, the rotatable display screen operates with a transparent background screen.

13. The display recited in claim 12 wherein changing the viewing surface of the rotatable display screen triggers a change of orientation of content displayed on the rotatable display screen.

14. The display recited in claim 13 wherein a position of a rotational component of the support structure triggers the change of orientation of the content displayed on the rotatable display screen.

* * * * *